US010672178B2

(12) United States Patent
Zimmerman

(10) Patent No.: US 10,672,178 B2
(45) Date of Patent: Jun. 2, 2020

(54) RAY TRAVERSAL WITH VIRTUAL GRIDS

(71) Applicant: Alvin D. Zimmerman, Pleasanton, CA (US)

(72) Inventor: Alvin D. Zimmerman, Pleasanton, CA (US)

(*) Notice: Subject to any disclaimer, the term of this patent is extended or adjusted under 35 U.S.C. 154(b) by 21 days.

(21) Appl. No.: 16/058,555

(22) Filed: Aug. 8, 2018

(65) Prior Publication Data

US 2020/0051310 A1    Feb. 13, 2020

(51) Int. Cl.
    *G06T 15/06*    (2011.01)
    *G06T 15/50*    (2011.01)

(52) U.S. Cl.
    CPC ............ *G06T 15/06* (2013.01); *G06T 15/506* (2013.01)

(58) Field of Classification Search
    CPC ..... G06T 15/06; G06T 15/08; G06T 2210/12; G06K 2209/21
    See application file for complete search history.

(56) References Cited

U.S. PATENT DOCUMENTS

| 7,495,664 B2* | 2/2009 | Keller ................... G06T 15/06 345/426 |
| 8,952,963 B1* | 2/2015 | Zimmerman ............. G06T 1/60 345/419 |
| 9,569,559 B2* | 2/2017 | Karras ................. G06F 16/9027 |
| 2019/0180409 A1* | 6/2019 | Moloney ................ G01C 21/20 |

* cited by examiner

*Primary Examiner* — Samantha (Yuehan) Wang
(74) *Attorney, Agent, or Firm* — Fountainhead Law Group P. C.

(57) ABSTRACT

Circuitry for identifying a closest intersected bounding volume in a target grid in a 3-dimensional scene includes circuitry that generates grid coordinates of candidate x-, y-, and z-planes in the target grid that belong to bounding volumes and which are closest to the ray. Comparator circuitry determines the closest plane among the candidate x-, y-, and z-planes to the ray. Circuitry generates an identifier of the bounding volume using the grid coordinates of the closest plane. The allocation of resources for some components comprising the circuitry is based on the number of planes that define the target grid, and for other components of the circuitry is based on the number of bounding volumes being considered.

8 Claims, 15 Drawing Sheets

RAY TRAVERSAL WITH VIRTUAL GRIDS

CROSS REFERENCE TO RELATED APPLICATIONS

This application is related to U.S. Pat. No. 8,952,963, issued Feb. 10, 2015, entitled "Computer Hardware Architecture and Data Structures for A Grid Traversal Unit to Support Incoherent Ray Traversal," the content of which is incorporated herein by reference in its entirety for all purposes. This application is related to U.S. application Ser. No. 15/986,600, filed May 22, 2018, entitled "Bounding Volume Hierarchy Using Virtual Grids," the content of which is incorporated herein by reference in its entirety for all purposes.

BACKGROUND

Computerized rendering of a scene involves simulating the interaction of light with objects in the scene. Ray tracing is a well studied technique that involves tracing the path of light as it bounces around the scene. A challenge with ray tracing is determining which parts of a scene are hit by a given ray of light. In order to render a scene with sufficient quality, the process can require tracing millions of rays through the scene. Objects in a scene are generally represented by triangles, although any suitable geometric shape can be used. Tracing a ray through a scene involves testing the ray for intersection with each triangle.

Scenes can easily contain many thousands of triangles, leading to many billions of ray/triangle intersection tests, which can quickly become impractical. It is generally accepted that calculating intersections between rays and triangles is the most computationally expensive aspect of the ray tracing method. Acceleration structures have been developed to reduce the number of ray/triangle intersections tests, and thus accelerate the image rendering process. The idea behind acceleration structures is to help decide as quickly as possible which triangles in a scene that a particular ray is likely to intersect and to reject the large majority of the triangles which the ray will never hit.

One type of acceleration structure is called the bounding volume hierarchy (BVH). The BVH is a hierarchical structure that partitions the objects in a scene. For example, where the objects are represented by triangles, a bounding volume may enclose all or portions of some triangles in the scene. Bounding volumes can be any suitable shape (e.g., sphere, cylinder, etc.), but are typically cubes (six square faces) or cuboids (six rectangular faces) and thus are commonly referred to as bounding boxes. The motivation behind bounding volumes is that performing an intersection test with a bounding volume is usually cheaper than performing the test with each triangle (or other geometry) enclosed by the bounding volume.

A BVH defines a tree comprising a root node corresponding to a bounding volume that contains all other bounding volumes, and hence all the triangles that comprise the scene. In other words, the bounding volume at the root node represents the entire scene. Each node in the tree has a number of children that are either internal nodes that contain further bounding volumes (e.g., a sub tree of bounding volumes) or are leaf nodes.

Building efficient acceleration structures for random spatial data (e.g., triangles) is an ever evolving and much published topic. Top-down and bottom-up builders have been researched with each having advantages and disadvantages. Top-down organizations work well with data sets that are too large to fit on-chip, while a bottom-up organization works well with data sets that can fit on-chip. As data sets continually grow in size, new hardware algorithms are required for organizing data structures that are too large to be stored on-chip. This and other issues are addressed by embodiments of the present disclosure, individually and collectively.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
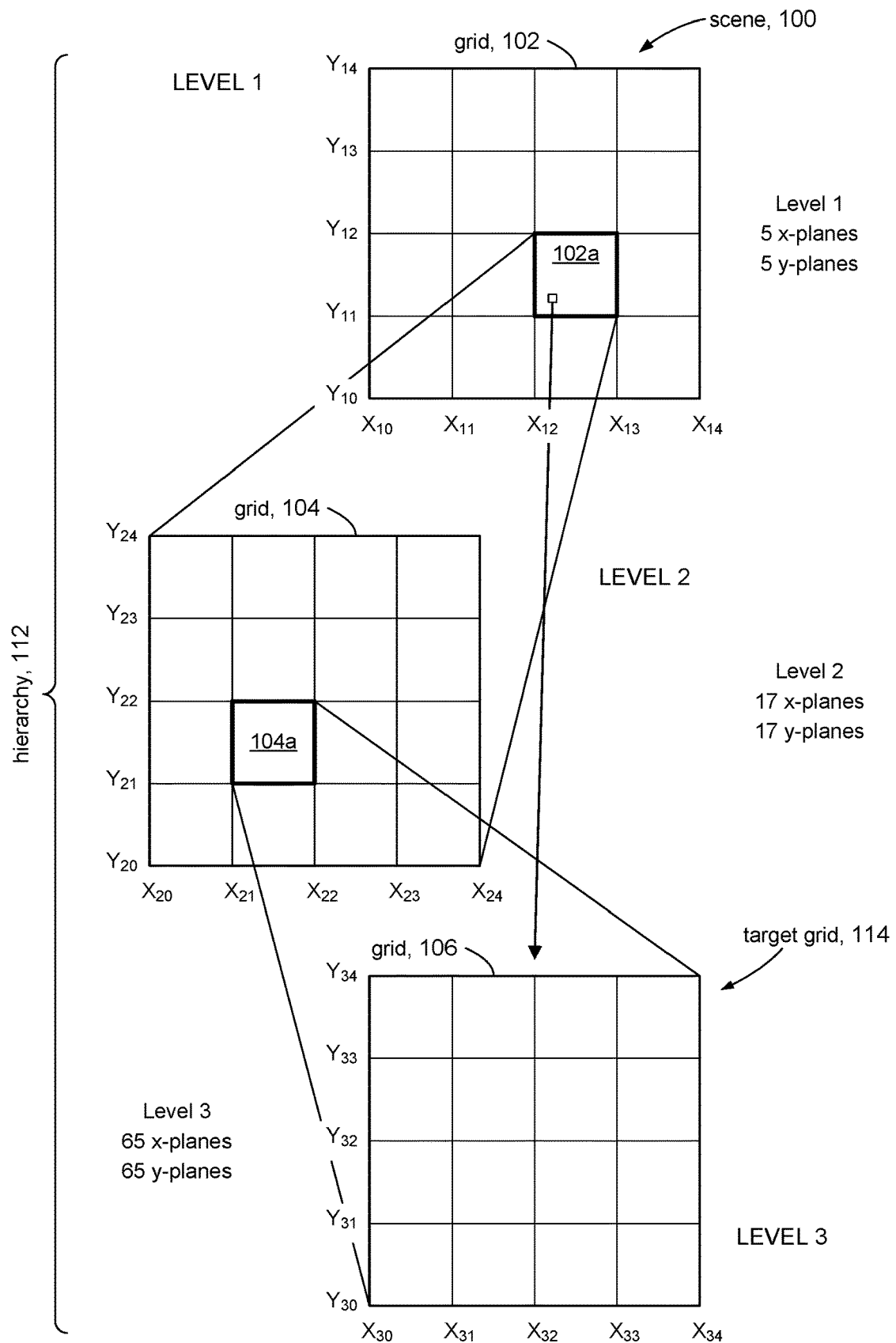
FIG. 1 illustrates an example of a scene and partitioning of a scene.

FIG. 1 shows an illustrative scene 100 to explain some terminology and conventions. For simplicity, the figure shows a 2D scene; however, persons of ordinary skill can be readily extend the discussion to a 3D scene. In accordance with some embodiments, the scene 100 can be partitioned (divided) into a grid of cells 102. The scene 100 can be partitioned into a hierarchy of grids 112, where each cell at one level in the hierarchy comprises a grid of cells at the next level in the hierarchy. For example a cell 102a in grid 102 at level 1, can comprise a grid 104 of cells at level 2; a cell 104a in grid 104 can comprise a grid 106 of cells at level 3, and so on. The resolution of the grids and number of levels can vary from one embodiment to another. Merely for discussion purposes, we can assume scene 100 to be partitioned into a hierarchy of three levels, with each level having a grid resolution of 4×4 cells, as depicted in FIG. 1, although in a given implementation there can be more (or fewer) than three levels in the hierarchy, the levels in the hierarch can have the same or different grid resolutions m×n as other levels, and m and n can be the same or different.

In some embodiments in accordance with the present disclosure, the grid resolutions can be expressed in powers of 2. For example, the grids 102, 104, 106, each, has a grid resolution of 4×4 cells at each level in the hierarchy 112. The grids 102, 104, 106 can be defined by partitioning planes (planes). A grid comprises x-planes (e.g., $X_{10}$, $X_{11}$, $X_{12}$, etc.), y-planes, and in the case of a 3D scene, z-planes. Additional details are disclosed in commonly owned U.S. Pat. No. 8,952,963, identified above.

Following is a discussion of a grid coordinate addressing convention as used herein in accordance with the present disclosure. with reference to FIG. 1. Grid addressing refers to the addressing of the planes that define the cells in a grid. In FIG. 1, for example, there are 5 x-planes and 5 y-planes that define the 4×4 grid of level 1 cells. The level 2 cells (16×16) are defined by 17 x-planes and 17 y-planes. In other words, 17 x- and y-planes divide the scene 100 into the 16×16 grid of level 2 cells. The level 3 cells (64×64) are defined by 65 x-planes and 65 y-planes, meaning that 65 x- and y-planes divide the scene 100 into the 64×64 grid of level 3 cells. The phrases "grid coordinates" and "grid addressing" are used interchangeably, and in most contexts have the same meaning.

Consider now the level 3 cells. The "full" grid address of an x-plane (or a y-plane) of a level 3 cell is 7-bits to uniquely identify each of the 65 x-planes. A "local" grid address, on the other hand, is used identify the five planes that define a target grid 114, and would only be a 3-bit address. Thus, for example, x-plane $X_{31}$ can be addressed by its full grid address (a 7-bit value) and also by its local grid address (a 3-bit value). The 3-bits that comprise the local grid address are the least significant bits (LSBs) of the full grid address. The upper 4-bits of the full grid address can be referred to as the most significant bits (MSBs) Likewise for the level 2 cells, but with a lower grid resolution, namely 5-bit full grid address, giving 2 bits of MSBs and 3 bits of LSBs; and for level 1 cells, the resolution is a 3-bit full grid address, where the full grid address and the local grid address are the same.

Figure 2:
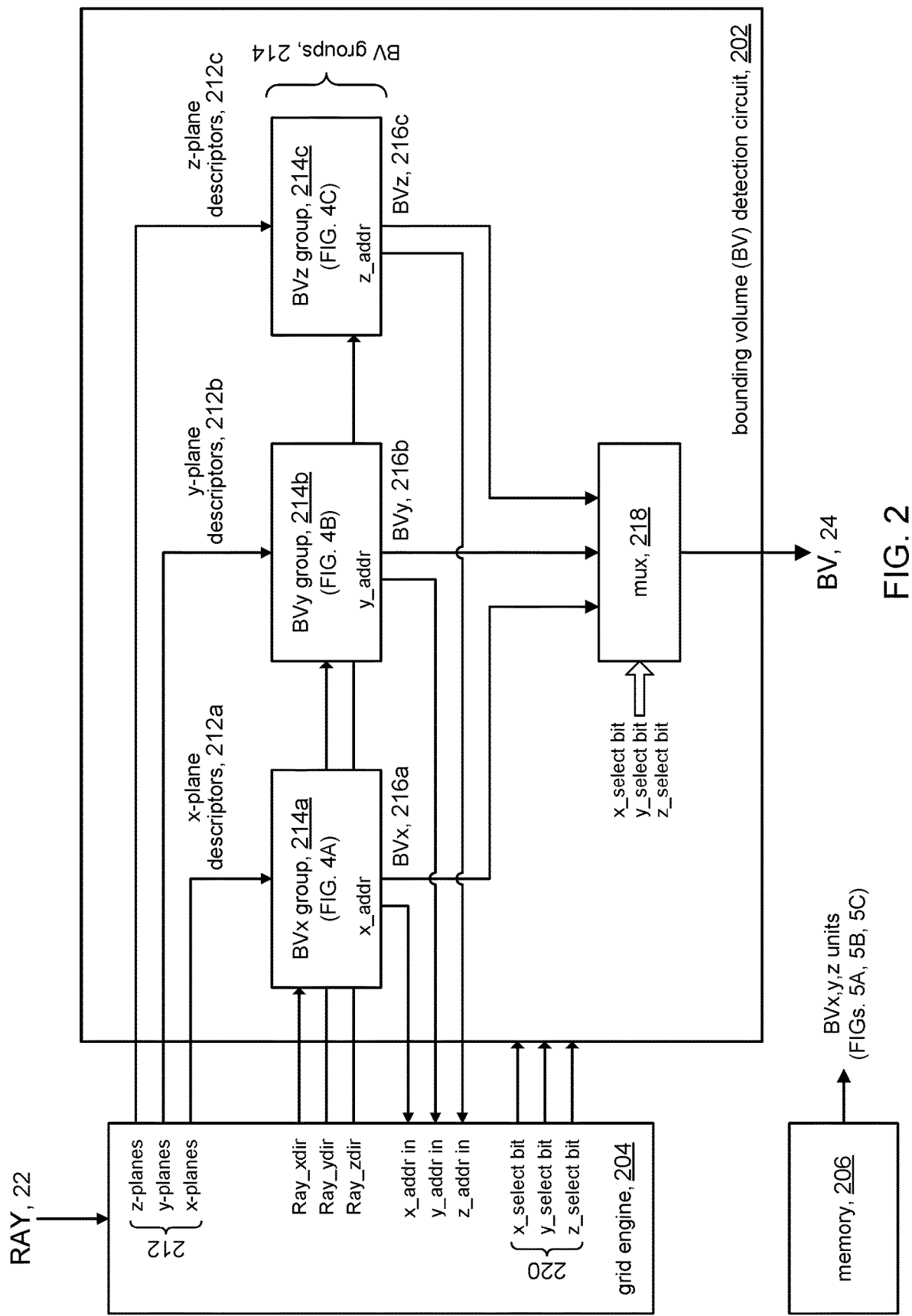
FIG. 2 shows a bounding volume detection circuit in accordance with some embodiments of the present disclosure.

FIG. 2 shows a high level block diagram of a boundary volume (BV) detection circuit 202 for determining boundary volume intersections in a set of N bounding volumes in accordance with some embodiments of the present disclosure. The BV detection circuit 202 can provide a hardware-based processing unit to process a target grid (e.g., 114, FIG. 1A) into which a ray 22 is shot. The BV detection circuit 202 can determine or otherwise identify the first bounding volume 24 within the target grid that is intersected by the ray 22 in the direction of traversal of the ray 22, from among the set of N bounding volumes to be considered. Unless otherwise noted, it will be understood that an intersection with the ray will to refer to an intersection point from the ray origin in the direction of the ray; the current position of the ray can be used as the ray origin. It is understood that the current position of the ray can be outside of the target grid. In cases, such as reflections that occur within the target grid, the ray origin can be within the target grid.

Inputs to the BV detection circuit 202 can include plane intersect descriptors 212a, 212b, 212c (collectively, plane descriptors 212). More particularly, there is an x-plane intersect descriptor 212a, a y-plane intersect descriptor 212b, and in the case of a 3D target grid, a z-plane intersect descriptor 212c. Each x-, y-, and z-plane comprising the target grid can be associated with a respective x-plane descriptor 212a, y-plane descriptor 212b, and z-plane descriptor 212c. In accordance with some embodiments, the plane descriptors 212 can comprise a set of bit lines in the BV detection circuit 202. In the case of an x-plane descriptor 212a, for example, the set of bits can include:

Vx—This is a valid bit associated with an x-plane that comprises the target grid. The valid bit is set (e.g., set to logic state '1') when the ray intersects the associated x-plane at a point within the target grid. Such an x-plane is also associated with a cell (the intersected cell) within the target grid. Stated differently, the valid bit can serve to indicate the x-plane is intersected by the ray and is a constituent plane of the intersected cell. Referring to the target grid 300 in FIG. 3, for example, Ray 1 intersects x-plane X0 at a point within the target grid 300, and so the valid bit in the x-plane descriptor for x-plane X0 would be set to logic state '1' when processing Ray 1. Note further that x-plane X0 is associated with cell 302 because it constitutes one of the planes that define cell 302. On the other hand, Ray 2 does not intersect x-plane X0 within the target grid 300 and so the valid bit in the x-plane descriptor for x-plane X0 would be set to logic state '0' when processing Ray 2.

y-addr data bits—When the valid bit is not set, these y-addr data bits have no meaning. When the valid bit is set, the y-addr data bits represent the local grid address of the y-plane of the intersected cell that the ray intersects, whether or not the point of intersection with that y-pane occurs in the intersected cell. Referring again to FIG. 3, in the case of Ray 1, y-addr would be the local grid address of the Y1 y-plane even though the intersection point is outside of the cell 302. This aspect of the present disclosure is addressed below. In the case of Ray 2, y-addr would have no meaning because the Vx bit in the x-plane descriptor for x-plane X0 would not be set.

z-addr data bits—In the case of a 3D target grid, z-addr is defined in the same way as for y-addr, but with reference to the z-planes (not shown) that comprise the target grid 300

A y-plane descriptor 212b, likewise, is associated with each y-plane of the target grid, and includes a Vy bit and x-addr and z-addr data bits defined in the same way as described above, but with reference to respective x- and z-planes. A z-plane descriptor 212c is similarly associated with each z-plane of the target grid, and includes a Vz bit and x-addr and y-addr data bits defined in the same way as described above, but with reference to respective x- and y-planes.

Figure 3:
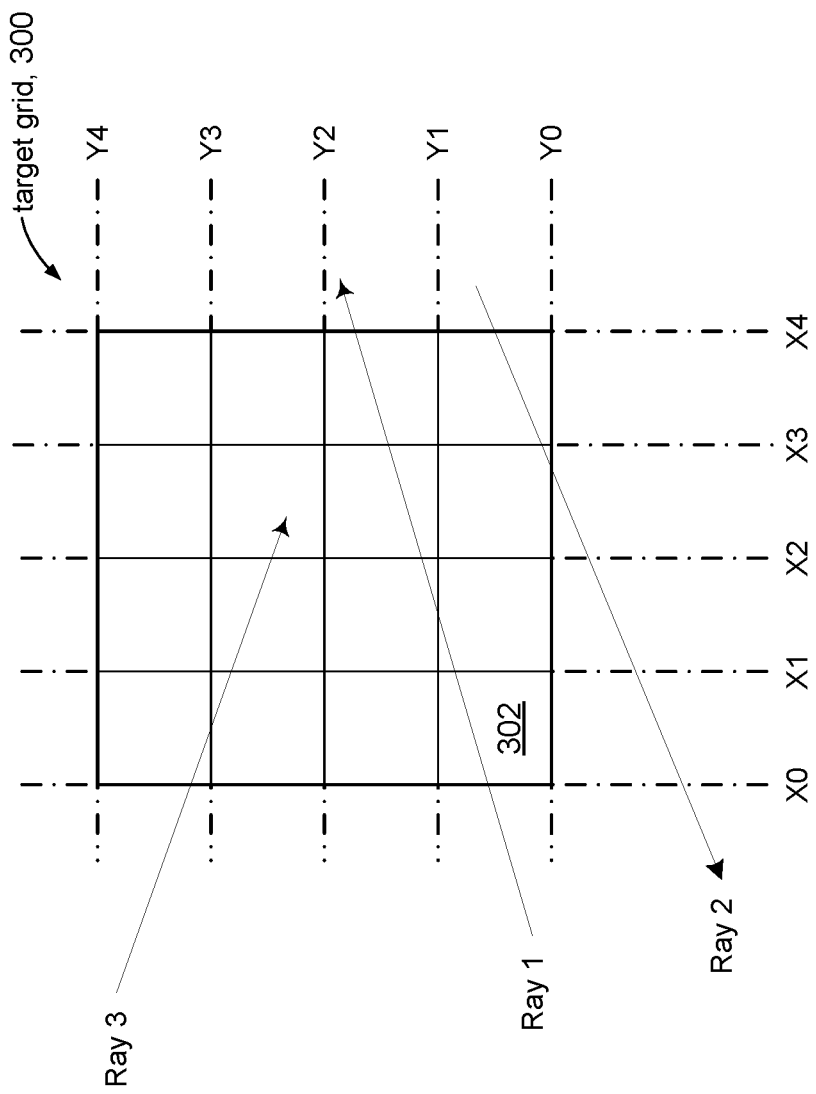
FIG. 3 illustrates an example of a target grid.

For example, with reference to the target grid example 300 in FIG. 3, for processing Ray 1, the Vx bit in the x-plane descriptors 212a for each of x-planes X0-X4 would be set, and the Vy bit in the y-plane descriptor 212b for only the y-planes Y2 and Y2 would be set. When processing Ray 2, the Vx bit only the x-plane descriptor 212a for x-plane X4 would be set, and the Vy bit in only the y-plane descriptor 212b for y-plane Y0. If the target grid 300 is a 3D grid, then there would be z-plane descriptors as well. Additional aspects of theses plane descriptors 212 are discussed below.

Continuing with FIG. 2, inputs to the BV detection circuit 202 can include plane select bits 220, namely an x_select bit, y_select bit, and z_select bit (in the case of a 3D target grid). These bits are explained below in connection with the discussion of the BV groups 214.

Inputs to the BV detection circuit 202 can include ray direction bits Ray_xdir, Ray_ydir, and Ray_zdir (for a 3D target grid). The ray 22 comprises an x-, y- and z-component. The ray direction bits indicate the direction (e.g., left/right, up/down, in/out) of traversal of each ray component. Referring to the target grid 300 in FIG. 3, the direction bit Ray_xdir for the x-component of Ray 1 can be logic state '1' to indicate the left-to-right direction, and the direction bit Ray_ydir for the y-component of Ray 1 can be logic state '1' to indicate the down-to-up direction. Accordingly, the direction bits Ray_xdir and Ray_ydir for Ray 2 would both be '0', and the direction bits for Ray 3 would be Ray_xdir='1' (left-to-right traversal) and Ray_ydir='0' (top to bottom traversal).

The inputs to the BV detection circuit 202 can come from any suitable source. In some embodiments, for example, inputs to the BV detection circuit 202 can come from grid engine 204, the details of which are described in commonly owned U.S. Pat. No. 8,952,963, identified above.

In some embodiments, a main memory 206 can store information associated with each of the N bounding volumes that are processed in the BV detection circuit 202. For example, the information can include data that define each bounding volume, including grid coordinates of the minimum and maximum planes along the x-direction, the y-direction, and the z-direction. As explained below, the data can be provided to the BV units shown in FIGS. 5A, 5B, and 5C.

The BV detection circuit 202 can include a BVx group 214a, a BVy group 214b, and a BVz group 214c (collectively, BV groups 214). The BV groups 214 are associated with and provide processing for respective x-, y-, and z-planes that comprise the target grid. The BV groups 214 can receive respective inputs (e.g., plane descriptors 212, select bits 220, and ray direction bits) provided to the BV detection circuit 202 as shown in FIG. 2.

Each of the BV groups 214 can output the grid address of a respective plane. For example, BVx group 214a can output the grid address x-addr of an x-plane that comprises the target grid, BVy group 214b can output the grid address y-addr of a y-plane, and BVz group 214c can output a grid address z-addr. As will be explained in more detail below, each such x-, y-, and z-plane is a constituent plane of a respective bounding volume within the target grid, which may or may not the same bounding volume. In particular, each such plane is the first x-, y-, and z-plane in target grid that is intersected by the ray 22.

The BV groups 214 can provide their respective grid coordinates x-addr, y-addr, and z-addr to the grid engine 204. As will be explained in more detail below, the grid engine 204 can determine which among the planes identified by the grid coordinates x-addr, y-addr, and z-addr is closest to the ray origin in the direction of ray traversal. The grid engine 204 can set the plane select bits 220 based on the closest plane and output those bits to respective ones of the BV groups 214. For example, the x_select bit is received by the BVx group 214a, the y_select bit is received by the BVy group 214b, and the z_select bit is received by the BVz group 214c. The BV groups 214 can output a value for their respective bounding volume identifiers 216a, 216b, 216c according to the plane select bits 220.

The BV detection circuit 202 can include mux 218 to select one of the bounding volume identifiers 216a, 216b, 216c based on the settings of the x_, y_, and z_select bits to yield a final bounding volume identifier 24, which as explained below represents the first (closest) bounding volume in the target grid that is intersected by the ray 22 in the ray direction.

Figure 4A:
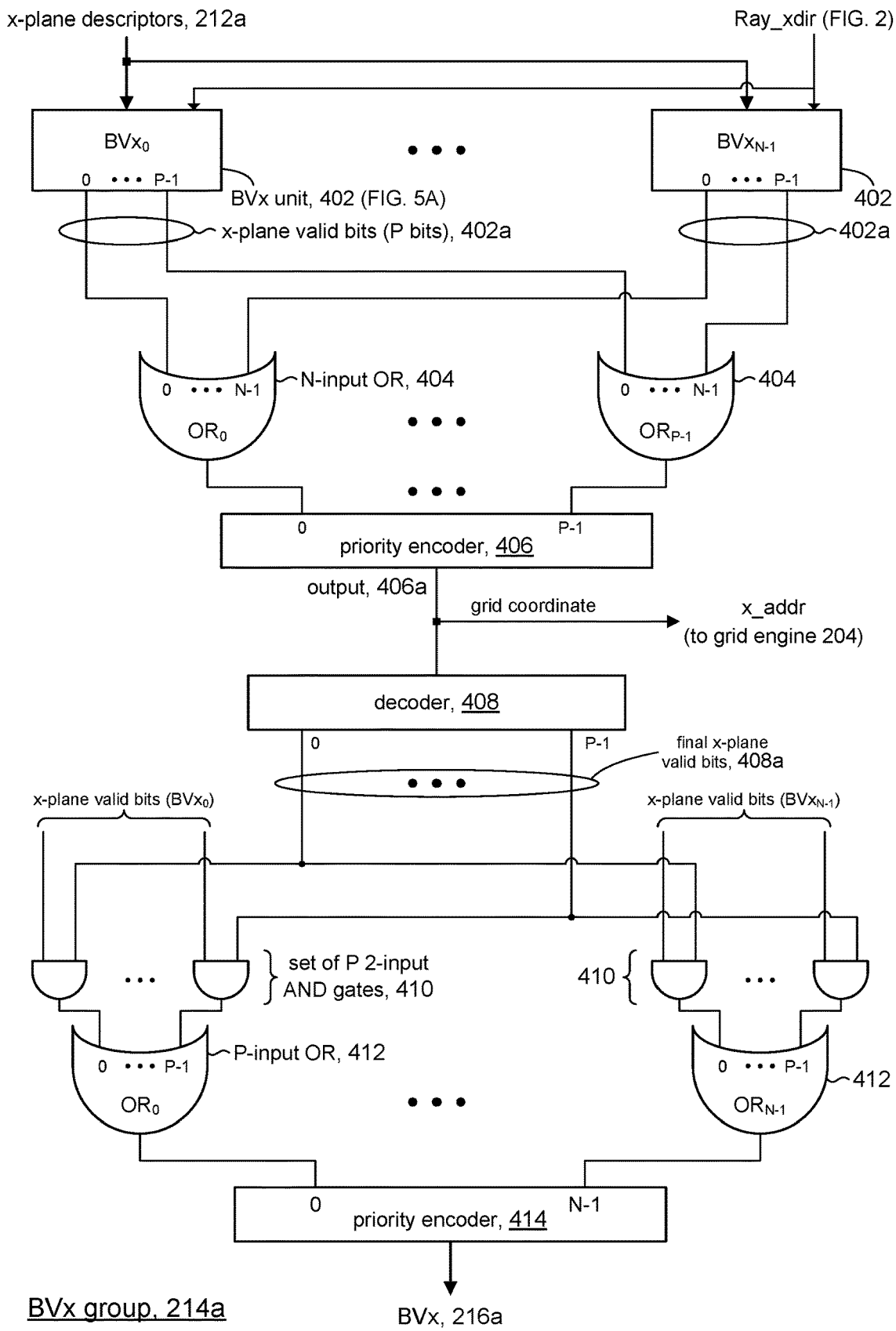
FIG. 4A shows an example of a BVx group in accordance with some embodiments of the present disclosure.
Figure 4B:
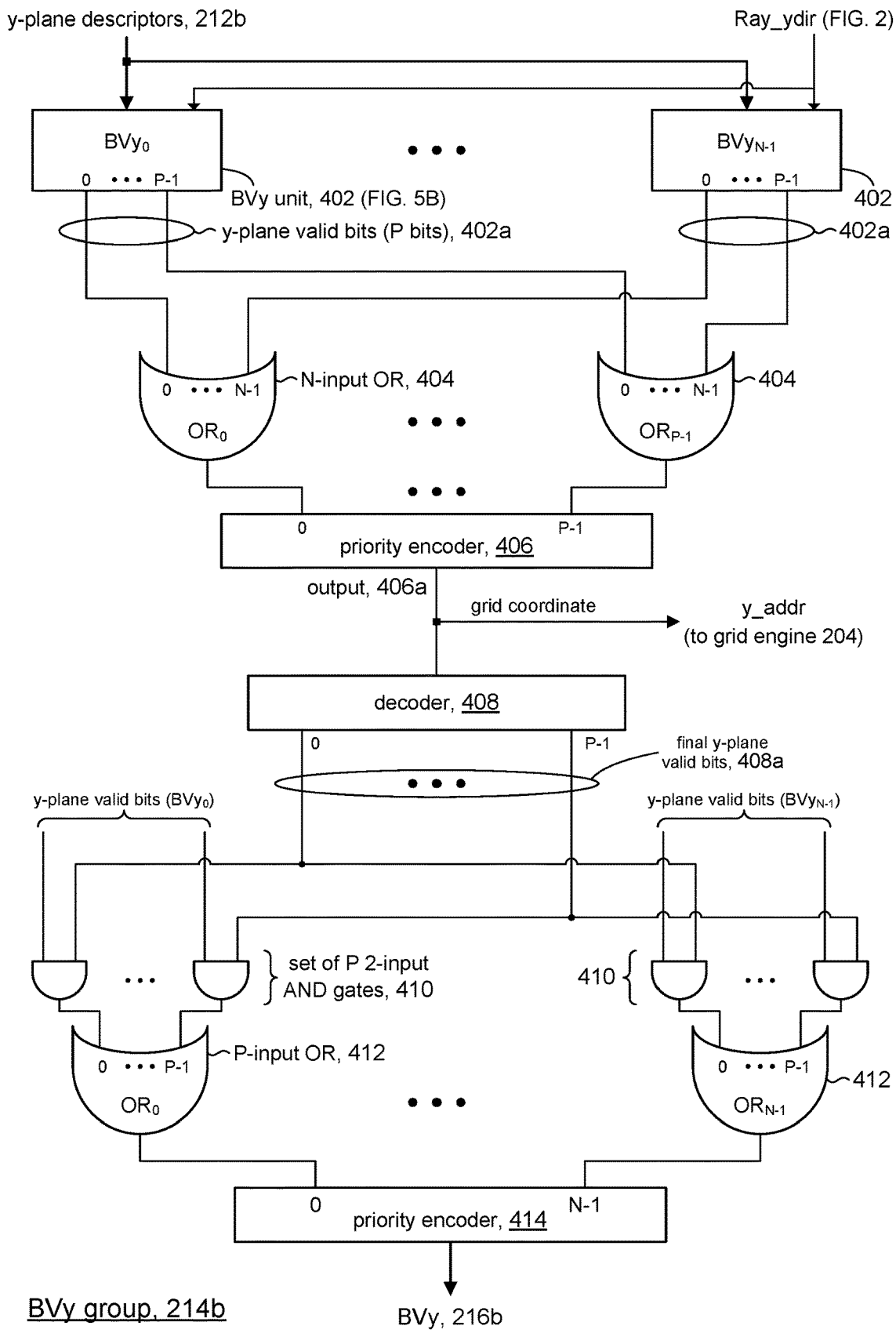
FIG. 4B shows an example of a BVy group in accordance with some embodiments of the present disclosure.

Referring now to FIG. 4A, the discussion will turn to a description of circuit details in the BVx group 214a. The BVy group 214b (FIG. 4B) and BVz group 214c (FIG. 4C) have the same circuit construction and operation as the BVx group 214a, but with inputs for y-plane and z-plane processing respectively. Recalling that a given target grid can encompass up to N bounding volumes, in some embodiments, the BVx group 214a can comprise a set of N BVx units 402, $BV_{x0}$ to $BV_{N-1}$ so that the BVx group 214a can process up to N bounding volumes at a time. Each BVx unit 402 corresponds to a bounding volume from the set of N bounding volumes to be considered; e.g., $BVx_0$ corresponds to bounding volume #0, $BVx_1$ corresponds to bounding volume #1, and so on to $BVx_{N-1}$ which corresponds to bounding volume #N−1. The value of N is implementation specific. Merely to illustrate, in some implementations for example the number of bounding volumes can be N=512, and the set of BVx units 402 would be 512 wide to handle the 512 bounding volumes in parallel at one time. The value of N can be larger (e.g., 1024) or smaller (e.g., 256). The value of N is not necessarily a power of 2. For example, in some embodiments, the value of N can be 500, or 1000, etc.

The x-plane descriptors 212a provided to the BVx group 214a can be fed into each of the BVx units 402 to be processed with the corresponding bounding volume. Likewise, the Ray_xdir bit provided to the BVx group 214a (FIG. 2) can feed into each of the BVx units 402. Each BVx unit 402 can output a set of P x-plane valid bits 402a, where P is the number of x-planes that comprise the target grid and each x-plane valid bit 402a corresponds to a constituent x-plane of the target grid. Thus, for example, the x-plane valid bits for the target grid 300 in FIG. 3 would include a bit that corresponds to x-plane X0, a bit that corresponds to x-plane X1, a bit that corresponds to x-plane X2, and so on. The number of planes that define the target grid along one direction (e.g., the x-direction) is the number of cells along that direction plus one. Thus, in FIG. 3, target grid 300 contains 4 cells in the x-direction and so five x-planes define the target grid. In accordance with the present disclosure, the x-plane valid bits 402a are ordered with respect to their respective x-planes. Referring to the target grid example 300 in FIG. 3, for instance, the first bit (e.g., bit 0) in the x-plane valid bits for target grid 300 would correspond to the first x-plane X0. The second bit (e.g., bit 1) in the x-plane valid bits would correspond to the second x-plane X1, the third bit would correspond to x-plane X2, and so on.

As explained in more detail below, an x-plane valid bit is set (e.g., logic '1') when its corresponding x-plane is a constituent plane of a bounding volume and has an intersection point with the ray 22 within the target grid. Consider, for example, the x-plane valid bits 402a produced by bounding volume unit $BVx_i$, which corresponds to bounding volume #i. Suppose bit position (numbered from 0 to P) b is set. This means the $b^{th}$ x-plane in the target grid is intersected by the ray 22 (taking into consideration the direction of the ray), is a constituent x-plane of bounding volume #i, and that bounding volume is within the target grid.

The x-plane valid bits 402a from the BVx units 402 feed into a set of P N-input OR gates 404. More specifically, bit 0 from the x-plane valid bits 402a of each of the N BVx units 402 feeds into one of the N inputs of OR gate $OR_0$, bit 1 from each of the x-plane valid bits 402a feeds into OR gate $OR_1$ (not shown), and so on. Accordingly, the output of the $i^{th}$ OR gate in the set of OR gates 404 indicates whether or not the $i^{th}$ x-plane in the target grid 1) is a constituent plane of a bounding volume and 2) has an intersection with the ray 22 within the target grid.

The outputs of the OR gates 404 feed into respective inputs of an P-bit priority encoder 406. The priority decoder 406 can generate output 406a, comprising $log_2(P)$ bits. The output 406a in an ordinal value that represents the ordinal position of first non-zero bit among the P input bits of the priority decoder 406. For example, if the 8-bit bit pattern '00011001' is fed to an 8-bit priority encoder, the 3-bit output value would be '011' indicating that the fourth bit position (ordinal position 4) contains the first non-zero bit, where a three bit output value of '000' refers to ordinal position 1. Details of a priority encoder can be found in commonly owned U.S. Pat. No. 8,952,963, identified above. With respect to the priority encoder 406, its output 406a represents the ordinal position of the first x-plane that is intersected by the ray 22 (FIG. 2) in the direction of the ray that is also a constituent x-plane of a bounding volume. In accordance with some embodiments, output 406a can be provided as the x_addr grid coordinate to the grid engine 204.

Referring for a moment to FIG. 2, the BVy group 214b will output similarly defined y_addr grid coordinate to the grid engine 204 generated in the same manner as describe above. The y_addr grid coordinate represents the ordinal position of the first y-plane that is intersected by the ray 22 and which is also a constituent y-plane of a bounding volume, which can be the same or different from the bounding volume associated with x_addr grid coordinate. Likewise, the BVz group 214c will output z_addr grid coordinate to the grid engine 204, which represents the ordinal position of the first z-plane that is intersected by the ray 22 and which is also a constituent z-plane of a bounding volume, which can be the same or different from the bounding volumes associated with x_addr and the y_addr grid coordinate.

The grid engine 204 can receive the x_addr, the y_addr, and the z_addr grid coordinates to perform (floating point) computations to compute the distance between each ray/plane intersect point and the ray origin; the ray origin can be a point outside of the target grid or within the target grid (e.g., in the case of a reflection). In some embodiments, the grid engine 204 can include floating point logic to perform the computations efficiently. The floating point computations are known. Details for an embodiment can be found in commonly owned U.S. Pat. No. 8,952,963, identified above. The grid engine 204 can assert a logic '1' on the x_select, y_select, or z_select bit line according to which plane, addressed by x_addr, y_addr, and the z_addr, is closest to the ray origin in the direction of the ray.

Continuing with FIG. 4A, the output 406a from priority encoder 406 can also feed into a decoder 408. The decoder 408 performs a reverse operation of the priority encoder 406. A decoder in accordance with embodiments of the present disclosure receives an n-bit input and outputs a $2^n$ bit value. The output bits are all logical state '0' except for the bit whose ordinal position is specified by the input value, which is set to logical state '1'. Using our example above, if the input is the 3-bit value '011', then the output would be the 8-bit value '0001000' using the convention that '000' refers to the first bit position, so that an input of '011' sets the fourth bit position in the output to logic state '1'. Details of a decode can be found in commonly owned U.S. Pat. No. 8,952,963, identified above. With respect to decoder 408, the decoder outputs a set of final x-plane valid bits 408a which identify, by way of a single set ('1') bit among the x-plane valid bits, the first x-plane that is intersected by the ray 22 in the direction of the ray that is also a constituent x-plane of a bounding volume.

The BVx group 214a includes a set of P 2-input AND gates 410 and a corresponding P-input OR gate 412. There is one such set of AND/OR gates 410/412 for each of the N bounding volumes. The x-plane valid bits 402a from each BVx unit 402 and the final x-plane valid bits 408a (from decoder 408) feed into a corresponding set of 2-input AND gates 410. The pairs of AND/OR gates 410/412 identify the bounding volume if any (from the entire set of N bounding volumes) that the first intersected x-plane (identified in the final x-plane valid bits 408a) is a constituent of. Thus, at most one pair of AND/OR gates 410/412 may output a logic '1', while the other pairs will output logic '0'.

The outputs from the pairs of AND/OR gates 410/412 feed into an N-input priority decoder 414 to produce output BVx 216a, which is a log 2(N) bit value that identifies the bounding volume, from the set of N bounding volumes, whose constituent x-plane is the x-plane in the target grid closest to the ray 22.

Similar processing of the set of N bounding volumes occurs (in parallel) in the BVy group 214b circuitry (FIG. 4B) to identify the bounding volume (BVy 216b) whose constituent y-plane is the y-plane in the target grid closest to the ray 22, and in the BVz group 214c (FIG. 4C) to identify the bounding volume (BVz 216c) whose constituent z-plane is the z-plane in the target grid closest to the ray 22. Referring back to FIG. 2, the outputs BVx 216a, BVy 216b, and BVz 216c feed into mux 218. The mux 218 selects, using the x_, y_, and z_select bits, an output (BV 24), from outputs 216a, 216b, 216c, that represents the first bounding volume in the target grid intersected by the ray 22 in the direction of the ray.

It will be appreciated in FIG. 4A (and in FIGS. 4B and 4C) that the allocation/design of resources (e.g., mux's, OR gates, AND gates, comparators, etc.) comprising the circuitry is based on the number N of bounding volumes and the number P of partitioning planes (x-planes, y-planes, z-planes) that define the target grid. This design paradigm of bounding volume-based allocation of resources and plane-based allocation of resources is used in the circuitry shown in the next set of figures to realize the foregoing discussed benefits.

Figure 4C:
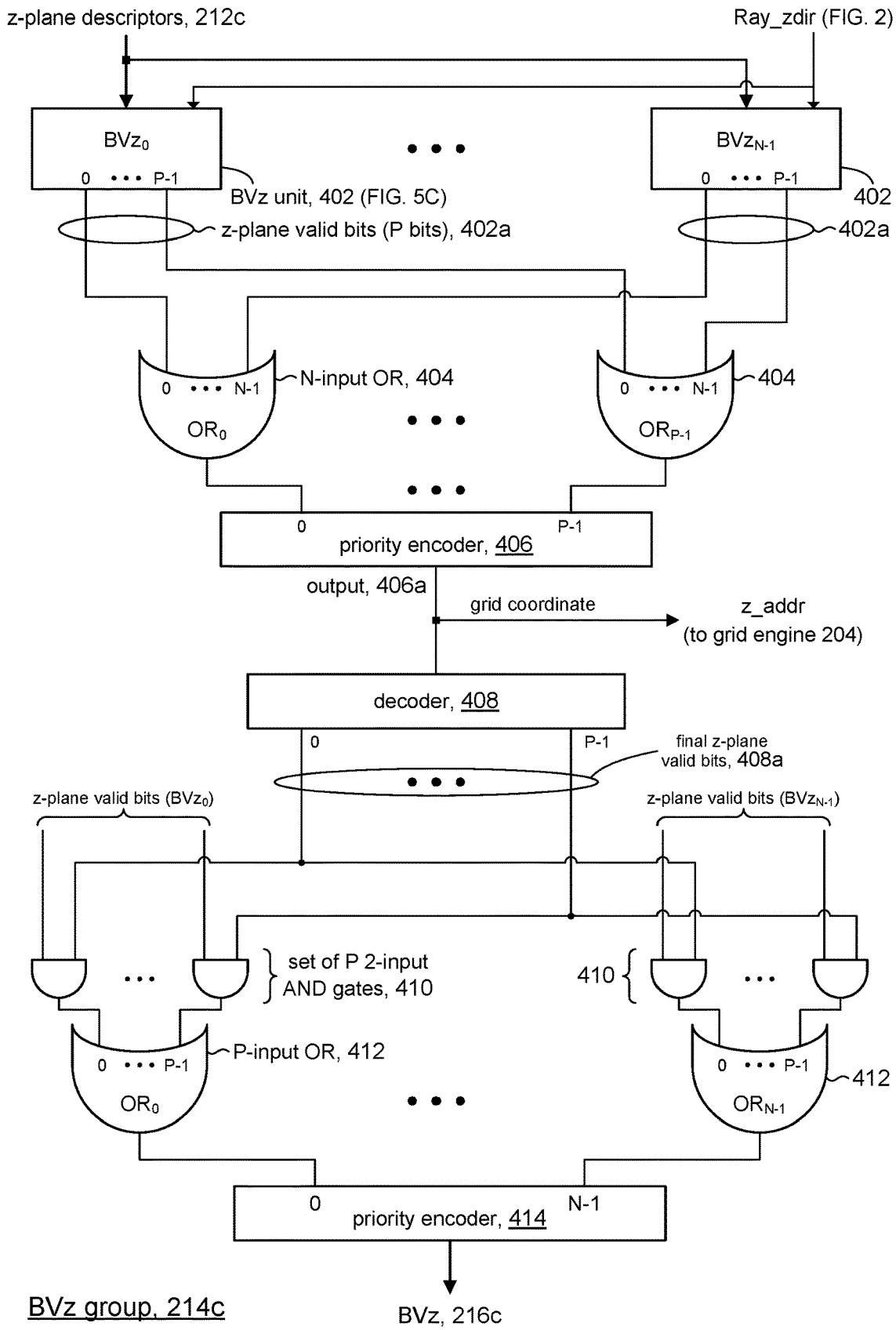
FIG. 4C shows an example of a BVz group in accordance with some embodiments of the present disclosure.
Figure 5A:
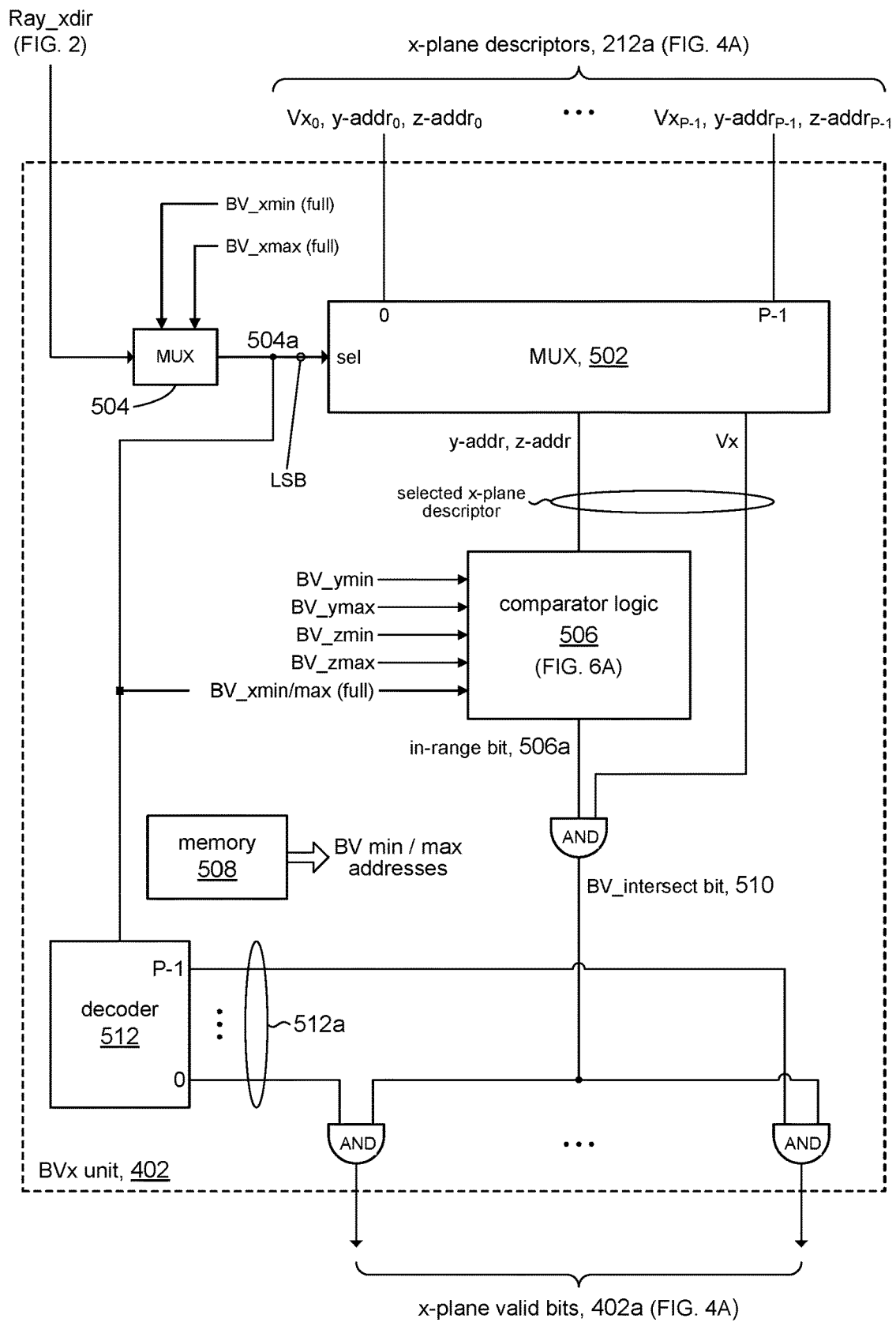
FIG. 5A shows an example of a BVx unit in accordance with some embodiments of the present disclosure.
Figure 5B:
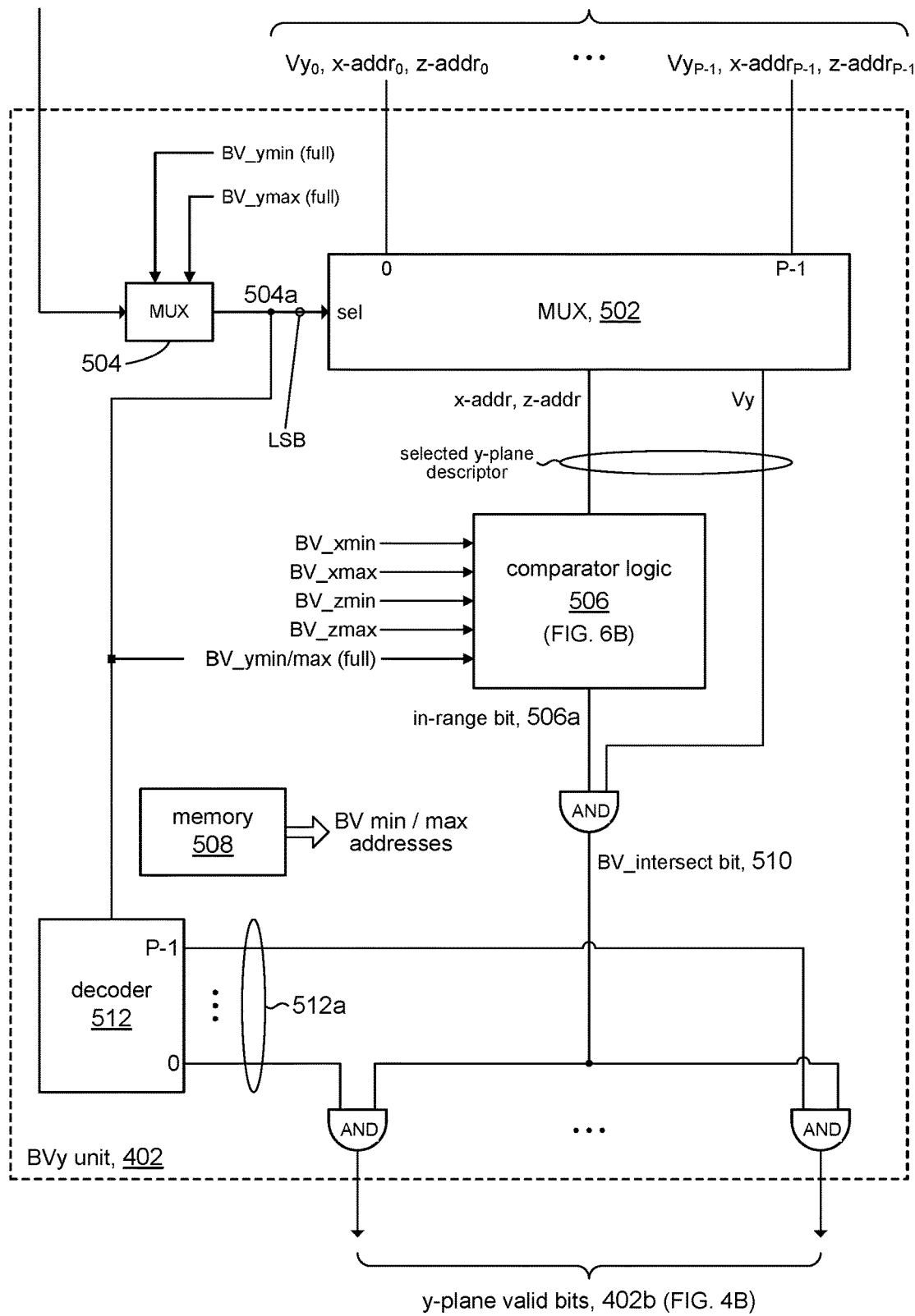
FIG. 5B shows an example of a BVy unit in accordance with some embodiments of the present disclosure.
Figure 5C:
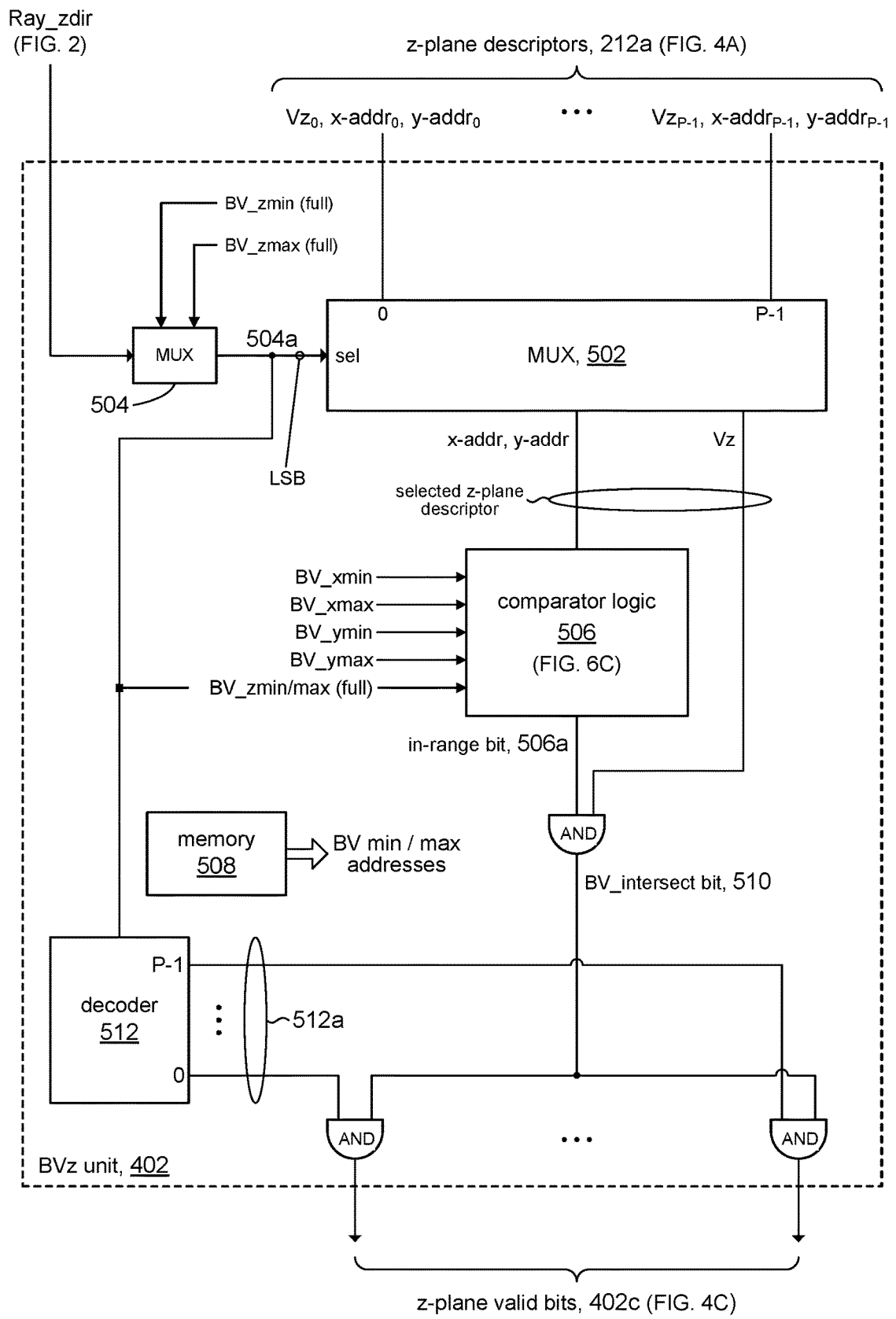
FIG. 5C shows an example of a BVz unit in accordance with some embodiments of the present disclosure.

Referring to FIG. 5A, the discussion will turn to a description of circuit details for a BVx unit 402 (FIG. 4A). It will be appreciated that each of the N BVx units 402 depicted in FIG. 4A can have the same circuit construction and operation. It will be appreciated from FIG. 5B that the BVy units 402 (FIG. 4B) in the BVy group 214b have the same construction and operation as the BVx unit 402, but using inputs for y-plane processing. Likewise, in FIG. 5C, the BVz units 402 (FIG. 4C) in the BVz group 214c have the same construction and operation as the BVx unit 402, but using inputs for z-plane processing.

Each BVx unit 402 corresponds to a bounding volume in the set of bounding volumes to be considered (referred to herein as the "corresponding bounding volume"). For example, if there are 512 bounding volumes to be considered, then in some embodiments there can be 512 BVx units 402, one for each bounding volume. A BVx unit 402 identifies an x-plane in the target grid that is intersected by the ray 22 and is a constituent x-plane of the corresponding bounding volume.

Each bounding volume in the set of bounding volumes is also processed in a corresponding BVy unit 402 (FIG. 4B) and BVz unit 402 (FIG. 4C). For example, $BVx_0$, $BVy_0$, $BVz_0$ in respective FIGS. 4A, 4B, 4C correspond to bounding volume #0, $BVx_1$, $BVy_1$, $BVz_1$ correspond to bounding volume #1, $BVx_2$, $BVy_2$, $BVz_2$ correspond to bounding volume #2, and so on up to $BVx_{N-1}$, $BVy_{N-1}$, $BVz_{N-1}$ for bounding volume #N−1.

The BVx unit 402 includes a memory 508 that stores information associated with its corresponding bounding volume, such as the grid coordinates of the x-, y-, and z-planes that define the corresponding bounding volume. In some embodiments, the memory 508 in a particular BVx unit i contains information that defines bounding volume #i; e.g., the left- and right-most (min/max) x-planes, the min/max y-planes, and the min/max z-planes. The same memory can be shared with the BVy and BVz units that correspond to bounding volume #i so that the BVx, BVy, and BVz units for bounding volume #i can operate in parallel. For example, $BVx_0$, $BVy_0$, $BVz_0$ can share the same memory 508 that defines bounding volume #0, another memory 508 that defines bounding volume #1 can be shared by $BVx_1$, $BVy_1$, $BVz_1$, and so on In other embodiments, the memory 508 can comprise pointers to a table in main memory 206. As explained above, memory 206 can store data for the set of N bounding volumes processed by the circuitry. In particular, memory 508 in a BVx unit 402 that corresponds to bounding volume i, can point to data in main memory 206 that is associated with bounding volume i. The memory 508 in the BV units that correspond to the same bounding volume point to the same data in memory 206 that define the bounding volume. For example, the memories 508 in $BVx_0$, $BVy_0$, $BVz_0$ point to data in memory 206 that define bounding volume #0, the memories 508 in $BVx_1$, $BVy_1$, $BVz_1$ point to data that define bounding volume #1, and so on.

The BVx unit 402 receives P x-plane descriptors 212a provided to the BVx group 214a as shown in FIG. 4A, where P is the number of x-planes that define the target grid. Suppose, for example, the target grid comprises an 8×8×8 grid of cells; the target grid would be defined by nine x-planes, nine y-planes, and nine z-planes. The BVx unit 402 would receive P=9 x-plane descriptors 212a.

A mux 502 selects one of the P x-plane descriptors 212a according to a bounding volume x-plane that defines the corresponding bounding volume. There is a minimum x-plane (e.g., the left side x-plane) of the corresponding bounding volume and a maximum x-plane (e.g., the right side x-plane) of the corresponding bounding volume. The bounding volume x-plane that is selected depends on the direction (Ray_xdir bit) of the x-component of the ray 22. If the x-component of the ray 22 traverses left to right, then the minimum x-plane of the corresponding bounding volume is used to select an x-plane descriptor 212a, and if x-component of the ray 22 traverses right to left, then the maximum x-plane of the corresponding bounding volume is used to select an x-plane descriptor 212a. In the case of BV units in the BVy group 214b, the min and max y-planes might correspond respectively to the lower and upper y-planes of the bounding volume. In the case of BV units in the BVz group 214c, the min and max z-planes might correspond respectively to the front and back z-planes of the bounding volume.

Figure 7:
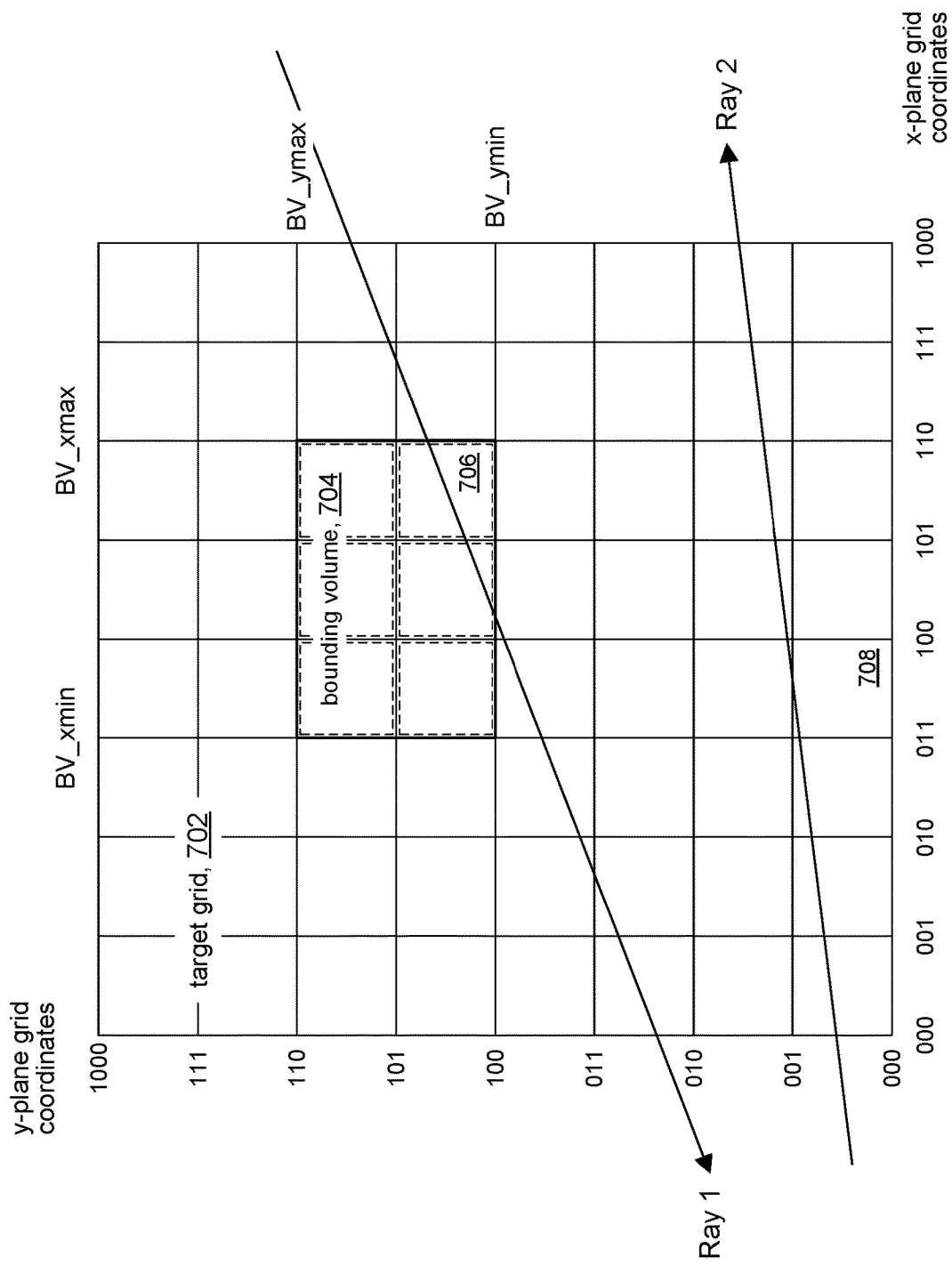
FIG. 7 illustrates an example of a target grid.

In some embodiments, the selector input for mux 502 can be another mux 504, where either the grid coordinate 504a of the minimum x-plane or the grid coordinate of the maximum x-plane is selected based on the Ray_xdir bit. FIG. 7 illustrates a target grid example 702, where Ray 1 comprises a right-to-left traversing x-component, and so mux 504 would output BV_xmax of the bounding volume 704, and the selected x-plane descriptor would correspond to the x-plane whose grid coordinate is 110. For Ray 2, the traversal is left-to-right, and so mux 504 would output BV_xmin of the bounding volume 704, and the selected x-plane descriptor would correspond to the x-plane whose grid coordinate is 011.

The input addresses BV_xmin and BV_xmax to mux 504 are full grid addresses at the resolution of the target grid. The selected min or max grid coordinate 504a includes an LSB component and a full grid address component. The full grid address component feeds into comparator logic 506. The LSB component of 504a is used to operate the mux 502 to select one of the x-plane descriptors 212a. The selected x-plane descriptor represents an x-plane of the corresponding bounding volume. The x-plane represented by the selected x-plane descriptor and the y- and z-planes identified by the y-addr and z-addr data bits in the selected x-plane descriptor define a cell intersected by the ray 22, which may or may not lie within the corresponding bounding volume. In the example in FIG. 7, for Ray 1, the intersected cell is cell 706; its y-plane grid coordinate (y-addr) is 100, assuming a 2D scene. For Ray 2, the intersected cell is cell 708; its y-plane grid coordinate (y-addr) is 001.

The y-addr and z-addr data bits of the selected x-plane descriptor feed into comparator logic 506 to determine if their respective y- and z-planes fall within the bounds of the corresponding bounding volume. The BV_ymin, BV_ymax, BV_zmin, and BV_zmax inputs are full grid addresses. The comparator logic 506 outputs an in-range bit 506a to indicate whether or not the cell represented by the selected x-plane descriptor is contained within the corresponding bounding volume. In the example in FIG. 7, cell 706 falls within the bounding volume 704 (assuming a 2D scene) because its y-plane falls with the y-plane bounds of the bounding volume 704, and so the in-range bit 506a would be set, for Ray 1. On the other hand, for Ray 2, the in-range bit 506a would be cleared because cell 708 falls outside of the bounding volume 704; its y-plane falls outside of bounding volume 704.

The in-range bit 506a is AND'd with the valid (Vx) bit from the selected x-plane descriptor to generate a BV_intersect bit 510 that indicates whether or not the corresponding bounding volume is intersected by the ray 22.

A decoder 512 receives the selected min or max x-plane from mux 504 and produces a P-bit output 512a that indicates the bit position of the selected x-plane within the target gird. Each bit in the output 512a is AND'd with the BV_intersect bit 510 to produce the x-plane valid bits 402a.

Figure 6A:
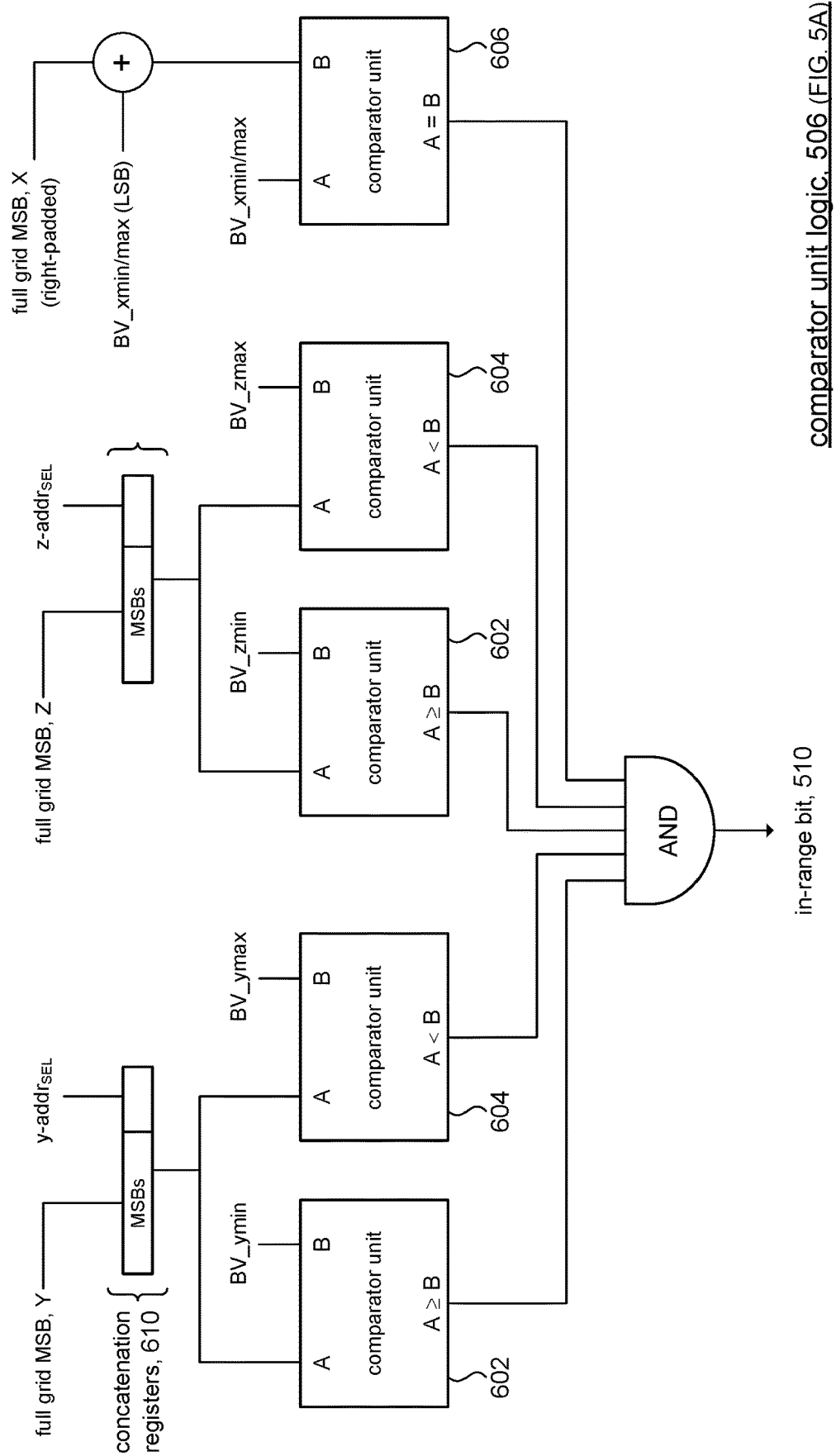
FIG. 6A shows an example of a comparator unit depicted in FIG. 5A.

Referring to FIG. 6A, the comparator logic 506 in accordance with some embodiments of the present disclosure is described, showing inputs from the BVx unit 402 in FIG. 5A. The comparator logic 506 performs the following logic:

```
if ( y-addr ≥ BV_ymin ) &&
   ( y-addr < BV_ymax ) &&
```

-continued

```
( z-addr ≥ BV_zmin ) &&
( z-addr < BV_zmax ) &&
(selected BV_xmin/max plane is in the target grid)
   then in-range bit ← '1'
   else in-range bit ← '0'
```

The comparator units 602, 604, 606 perform the indicated arithmetic comparisons using the data widths of the full grid addresses, and output a logic '1' if the indicate comparison is true, and '0' otherwise. The comparator units 602, 604 test whether the selected y-plane falls with the bounds of the y-planes of the bounding volume, and likewise whether the selected z-plane falls with the bounds of the z-planes of the bounding volume. The comparator unit 606 tests whether the selected bounding volume x-plane (min x-plane or max x-plane) is a plane in the target grid.

The bounding volume grid coordinates BV_ymin, BV_zmin are already expressed as full grid addresses. However, the data bits of the selected y-addr and z-addr are grid coordinates of the y- and z-planes in the target grid are expressed as local grid addresses, and therefore constitute only the LSBs of their respective full grid addresses. Accordingly, in some embodiments, the comparator logic 506 can include a set of concatenation registers to add the MSBs of the full grid addresses of the y-, and z-planes that define the target grid to the selected y-addr and z-addr data bits.

Figure 6B:
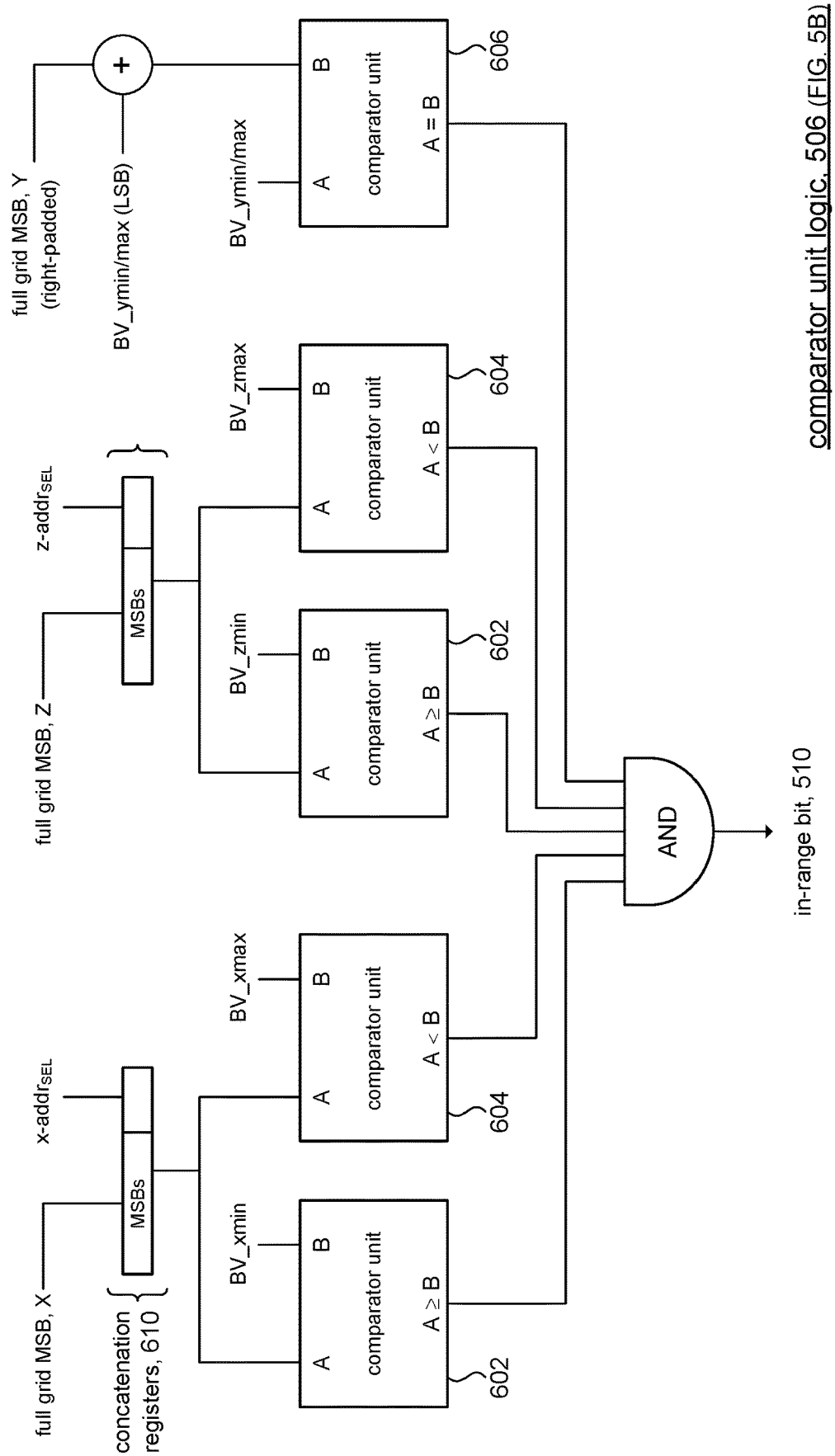
FIG. 6B shows an example of a comparator unit depicted in FIG. 5B.
Figure 6C:
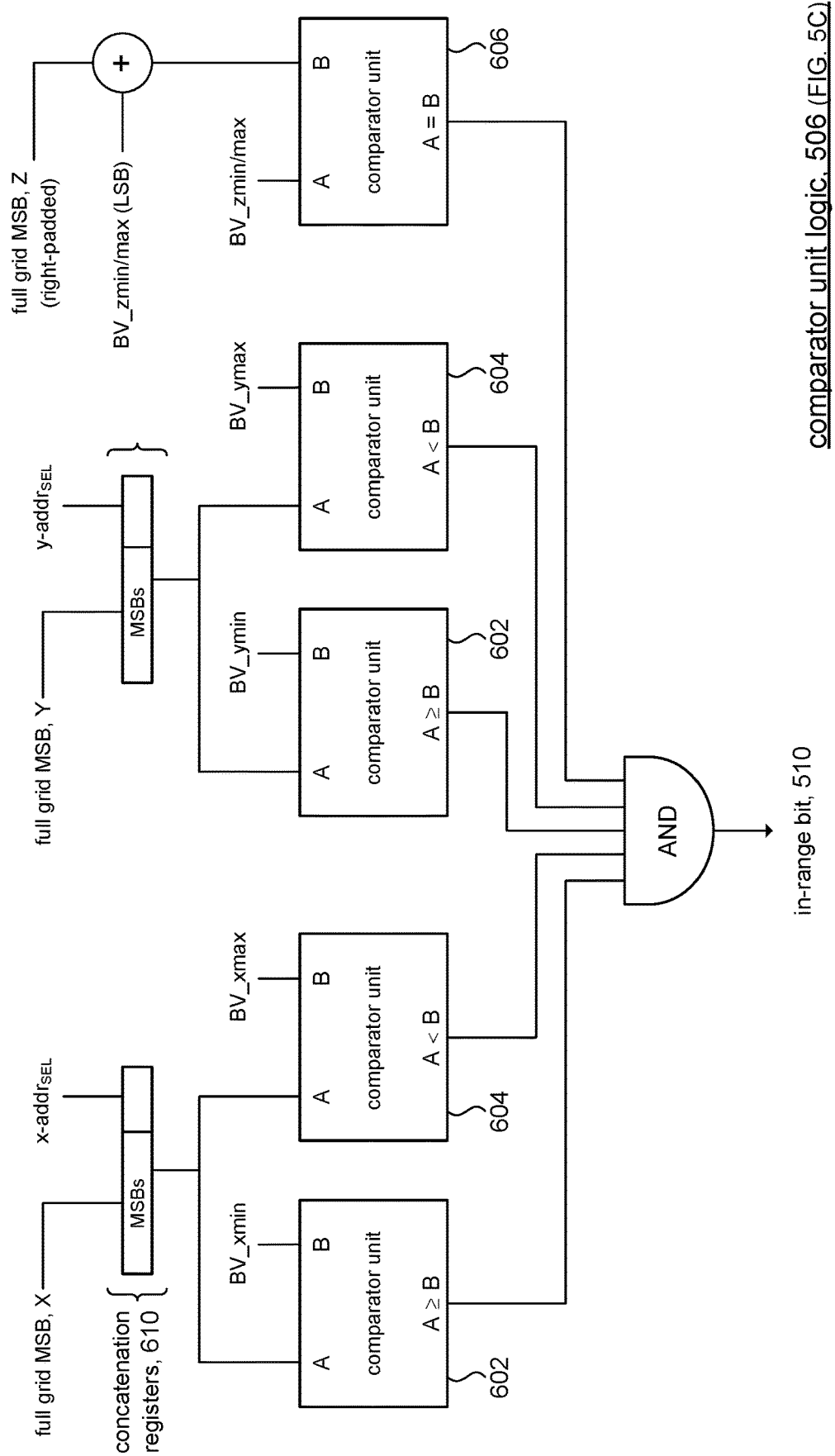
FIG. 6C shows an example of a comparator unit depicted in FIG. 5C.

FIG. 6B shows the same comparator circuit 506, as used in a BVy unit 402 (FIG. 4B) and receiving inputs for y-plane processing. Likewise, FIG. 6C shows the same comparator circuit 506, as used in a BVz unit 402 (FIG. 4C) and receiving inputs for z-plane processing.

Figure 8:
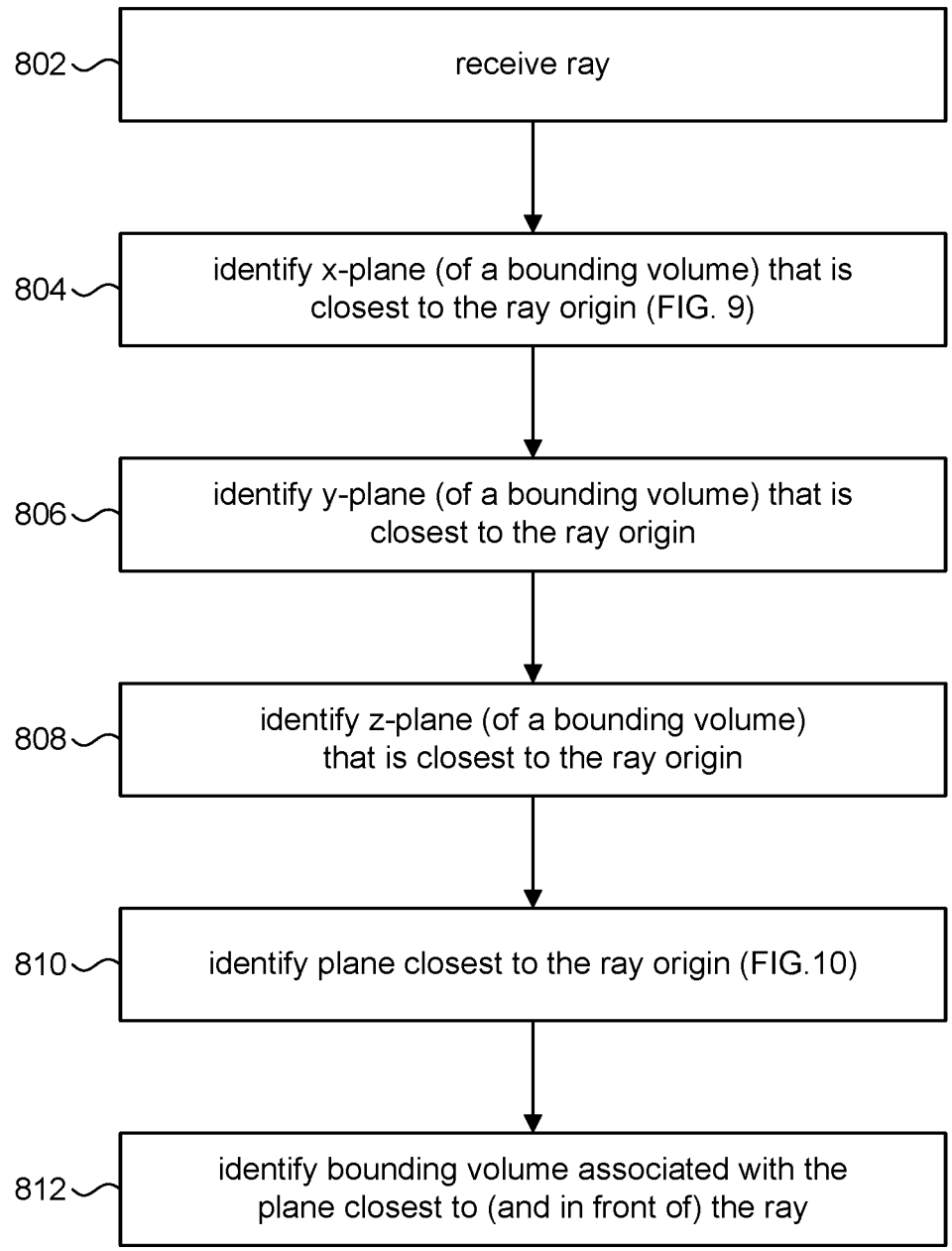
FIG. 8 shows processing to identify a bounding volume in accordance with the present disclosure.

Referring to FIG. 8, the discussion will now turn to a high level description of processing by the foregoing described circuitry for identifying a bounding volume in a target grid that is intersected by a ray in accordance with some embodiments of the present disclosure.

At operation 802, the circuitry can receive a ray. For example, the grid engine 204 can receive ray 22 that is shot into a target grid that contains a set of bounding volumes, and produce the various data bits described above, for instance the plane intersect descriptors 212 and direction bits that indicate the direction of traversal of the x-, y-, and z-components of the ray 22.

At operation 804, the circuitry can identify an x-plane (closest x-plane), among the x-planes that define the target grid, that is an x-plane of a bounding volume and which is closest to and in front of the current ray position (ray origin) in the direction of the ray. The circuitry shown in FIGS. 4-6, for example, can identify a closest x-plane. In particular, the output 406a of priority encoder 406 in FIG. 4A represents the grid coordinate in the target grid of the closest x-plane.

At operation 806, the circuitry can identify a y-plane (closest y-plane), among the y-planes that define the target grid, that is a y-plane of a bounding volume and which is closest to and in front of the current ray position (ray origin) in the direction of the ray. The circuitry to identify the closest y-plane is similar to the circuitry shown in FIGS. 4-6.

At operation 808, the circuitry can identify a z-plane (closest z-plane), among the z-planes that define the target grid, that is a z-plane of a bounding volume and which is closest to and in front of the current ray position (ray origin) in the direction of the ray. The circuitry to identify the closest z-plane is similar to the circuitry shown in FIGS. 4-6.

At operation 810, the circuitry can identify, from among the x-, y-, and z-planes identified at operations 804-808, the plane that is closest to the ray origin. For example, the output 406a from the priority encoder 406 (e.g., FIG. 4A) from each of the BVx group 214a, BVy group 214b, and BVz group 214c can feed into floating point circuits in the grid engine 204 (FIG. 2) to make the computations. The grid engine 204 can output a set of select bits (x_, y_, and z_select bits), one of which will be set to indicate the closest plane.

At operation 812, the circuitry can identify the bounding volume associated with the closest plane identified in block 810. For example, the mux 218 in FIG. 2, can select from the outputs 216a, 216b, 216c using the x_, y_, and z_select bits.

Figure 9:
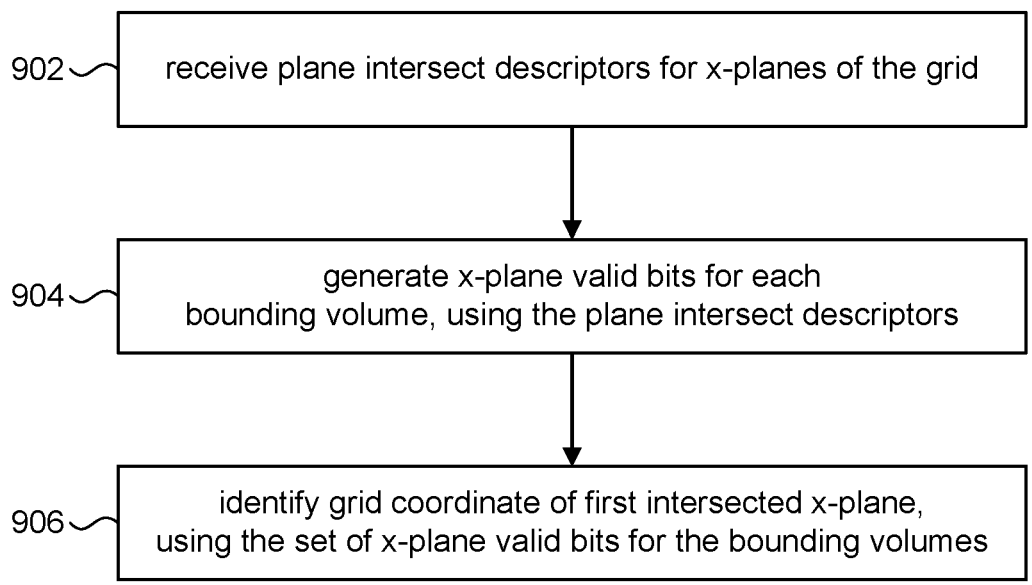
FIG. 9 shows processing to identify a closest x-plane in accordance with the present disclosure.

Referring to FIG. 9, the discussion will now turn to a high level description of processing by the foregoing described circuitry for identifying, in accordance with some embodiments of the present disclosure, the x-plane in the target grid that belongs to a bounding volume and is closest to the ray. It will be appreciated that the following description is applicable to circuitry for identifying the y-plane in the target grid that belongs to a bounding volume and is closest to the ray, and to circuitry for identifying the z-plane in the target grid that belongs to a bounding volume and is closest to the ray.

At operation 902, the circuitry can receive x-plane intersect descriptors 212a for the target grid. See, for example, details of the BVx group 214a in FIG. 4A, where x-plane descriptors 212a feed into a set of BVx units 402. A similar operation occurs with respect to y-plane intersect descriptors 212b and z-plane intersect descriptors 212c; see details in respective FIGS. 4B and 4C.

At operation 904, the circuitry can generate x-plane valid bits for each bounding volume. See, for example, FIG. 4A the outputs of the BVx units 402. For a given bounding volume, the x-plane valid bits identify the first x-plane (e.g., left- or right-side x-plane), if any, of the given bounding volume is intersected by the ray at a point within the given bounding volume. A similar operation occurs with respect to y-plane valid bits and z-plane valid bits; see details in respective FIGS. 4B and 4C.

At operation 906, the circuitry can identify the grid coordinate of the first intersected x-plane that belongs to a bounding volume using the set of x-plane valid bits generated at operation 904. See, for example, the OR gates 404 and priority encoder 406 in FIG. 4A, where the output 406a is the grid coordinate of the x-plane that is part of a bounding volume and is the first such x-plane to be intersect by the ray. A similar operation occurs for the grid coordinate of a first intersected y-plane and the grid coordinate of a first intersected z-plane; see details in respective FIGS. 4B and 4C.

Figure 10:
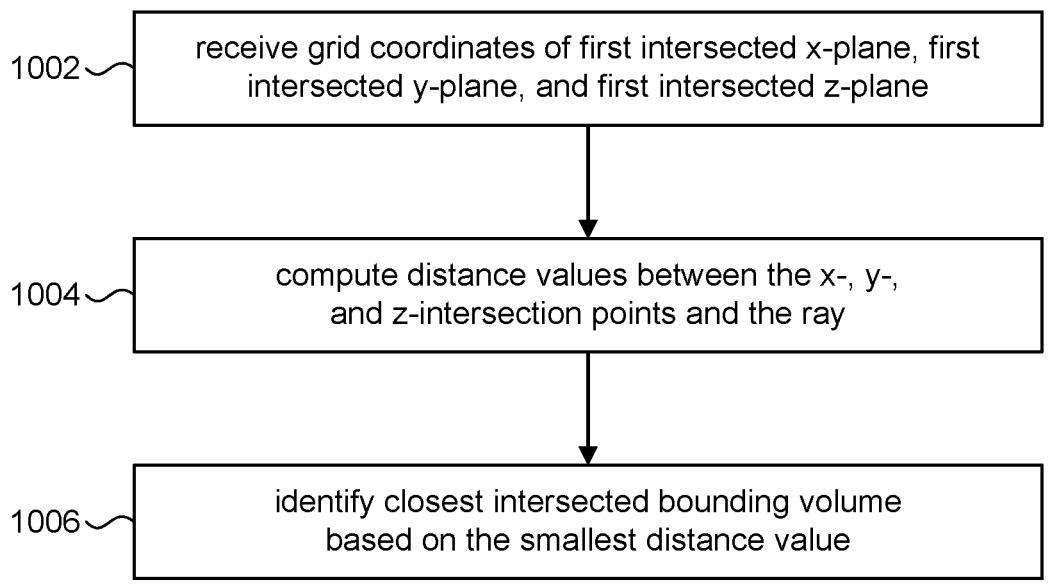
FIG. 10 shows processing to identify a closest intersected bounding volume in accordance with the present disclosure.

Referring to FIG. 10, the discussion will now turn to a high level description of processing by the foregoing described circuitry for identifying, in accordance with some embodiments of the present disclosure, the bounding volume closes to the ray using the first intersected x-, y-, and z-planes determined in accordance with the processing in FIG. 9.

At operation 1002, the circuitry can receive the grid coordinate of the x-plane that is first intersected by the ray that belongs to a bounding volume, the grid coordinate of the y-plane that is first intersected by the ray that belongs to a bounding volume, and the grid coordinate of the z-plane that is first intersected by the ray that belongs to a bounding volume. The bounding volumes can be same or different bounding volumes. See, for example, FIG. 2 where the x_, y_, and z addr outputs of respective BVx, BVy, and BVz groups are the grid coordinates.

At operation 1004, the circuitry can compute a distance value between the ray intersection point on the x-plane and the ray origin, a distance value between the ray intersection point on the y-plane and the ray origin, and a distance value between the ray intersection point on the z-plane and the ray origin. In some embodiments, the distance values can be provided to the grid engine 204 to perform to the computation using its floating point hardware.

At operation 1006, the circuitry can identify the first intersected bounding volume based on the smallest of the distance values computed at operation 1004. Referring to FIG. 4A, for example, the circuitry including decoder 408 and priority encoder 414 convert the x-addr grid coordinate, which identifies an x-plane of a bounding volume, into an identifier (BVx 216a) of that bounding volume. A similar conversion occurs in circuitry for the BVy group 214b, which converts the y-addr grid coordinate of a y-plane of a bounding volume into an identifier (BVy 216b) of that bounding volume. Likewise for circuitry in the BVz group 214c, which converts the z-addr grid coordinate of a a-plane of a bounding volume into an identifier (BVz 216c) of that bounding volume. In FIG. 2, these bounding volume identifiers feed into mux 218 where the x_, y_, and z_select bits will select one of the bounding volume identifiers of the closest bounding volume to the ray.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A circuit to process traversal of a ray through a target grid in a scene, the circuit comprising:
    first circuit means for determining an x-plane of a first bounding volume, from among a plurality of bounding volumes, that is closest to the ray;
    second circuit means, operating in parallel with the first circuit means, for determining a y-plane of a second bounding volume, from among the plurality of bounding volumes, that is closest to the ray;
    third circuit means, operating in parallel with the first and second circuit means, for determining a z-plane of a third bounding volume, from among the plurality of bounding volumes, that is closest to the ray; and
    a selector connected to outputs of the first, second, and third circuit means to select a closest plane from among the x-plane determined by the first circuit means, the y-plane determined by the second circuit means, and the z-plane determined by the third circuit means and to output a bounding volume associated with the selected plane,
    wherein the first circuit means comprises:
        N x-plane bounding volume units, where N is a number of bounding volumes in the plurality of bounding volumes, each x-plane bounding volume unit corresponding to one of the plurality of bounding volumes, each x-plane bounding volume unit configured to generate a set of P x-plane valid bits that correspond to x-planes of the target grid, where P is a number of x-planes that define the target grid, wherein an x-plane valid bit is set when its corresponding x-plane is a constituent plane of the corresponding bounding volume and intersects the ray within the target grid; and
        means for identifying the first bounding volume from the N sets of x-plane valid bits
    wherein N and P are numbers other than a power of 2.

2. The circuit of claim 1, wherein the first circuit means includes an input to receive x-plane descriptors that correspond to the x-planes of the target grid, wherein each x-plane descriptor comprises:
    a valid bit that is set when the ray intersects the corresponding x-plane within the target grid, the x-plane being a constituent x-plane of a cell (intersected cell) in the target grid;
    y-addr data bits that, when the valid bit is set, represent a y-plane that is intersected by the ray and is a constituent y-plane of the intersected cell; and
    z-addr data bits that, when the valid bit is set, represent a a-plane that is intersected by the ray and is a constituent a-plane of the intersected cell,
    wherein the first bounding volume is determined based on the x-plane descriptors of the target grid.

3. The circuit of claim 2, wherein the second circuit means includes an input to receive y-plane descriptors that correspond to the y-planes of the target grid, wherein the second bounding volume is determined based on the y-plane descriptors of the target grid.

4. The circuit of claim 3, wherein the third circuit means includes an input to receive z-plane descriptors that correspond to the z-planes of the target grid, wherein the third bounding volume is determined based on the z-plane descriptors of the target grid.

5. The circuit of claim 1, wherein the second circuit means comprises:
    means for generating N sets of P y-plane valid bits that correspond to y-planes of the target grid, wherein N is a number of bounding volumes in the plurality of bounding volumes and P is a number of y-planes that define the target grid, wherein each set of P y-plane valid bits corresponds to a bounding volume, wherein a y-plane valid bit is set when its corresponding y-plane is a constituent plane of the corresponding bounding volume and intersects the ray within the target grid; and
    means for identifying the second bounding volume from the y-plane valid bits.

6. The circuit of claim 1, wherein the third circuit means comprises:
    means for generating z-plane valid bits that correspond to z-planes of the target grid, wherein a z-plane valid bit is set when its corresponding z-plane is a constituent plane of one of the plurality of bounding volumes and intersects the ray within the target grid; and
    means for identifying the third bounding volume from the y-plane valid bits.

7. The circuit of claim 1, wherein the first, second, and third bounding volumes are different from each other.

8. The circuit of claim 1, wherein the first, second, and third bounding volumes are the same bounding volumes.

* * * * *